Figure 4:
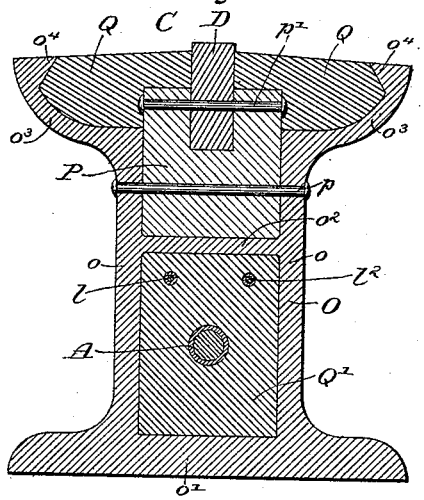

(No Model.) 2 Sheets—Sheet 1.
C. K. HARDING.
ELECTRIC RAILWAY SYSTEM.
No. 437,358. Patented Sept. 30, 1890.
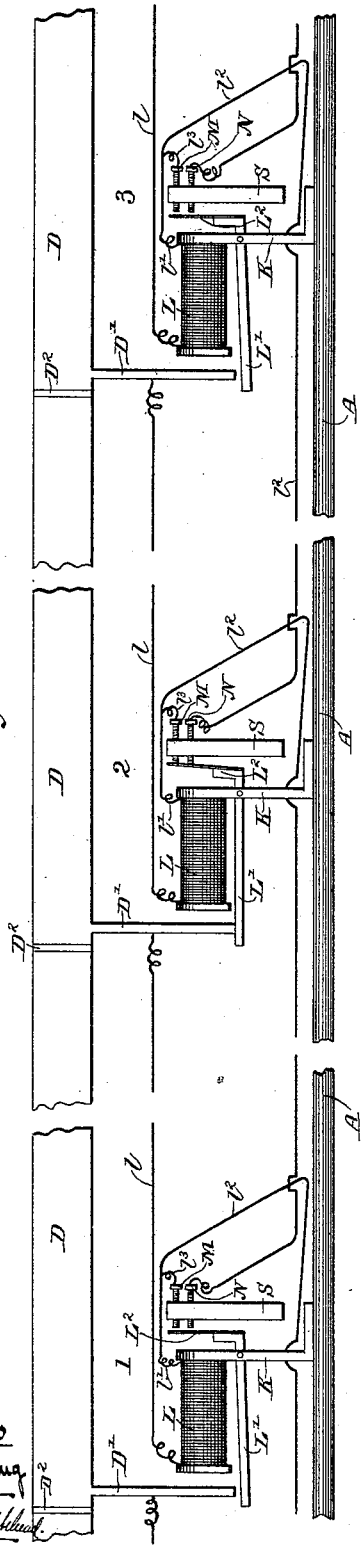
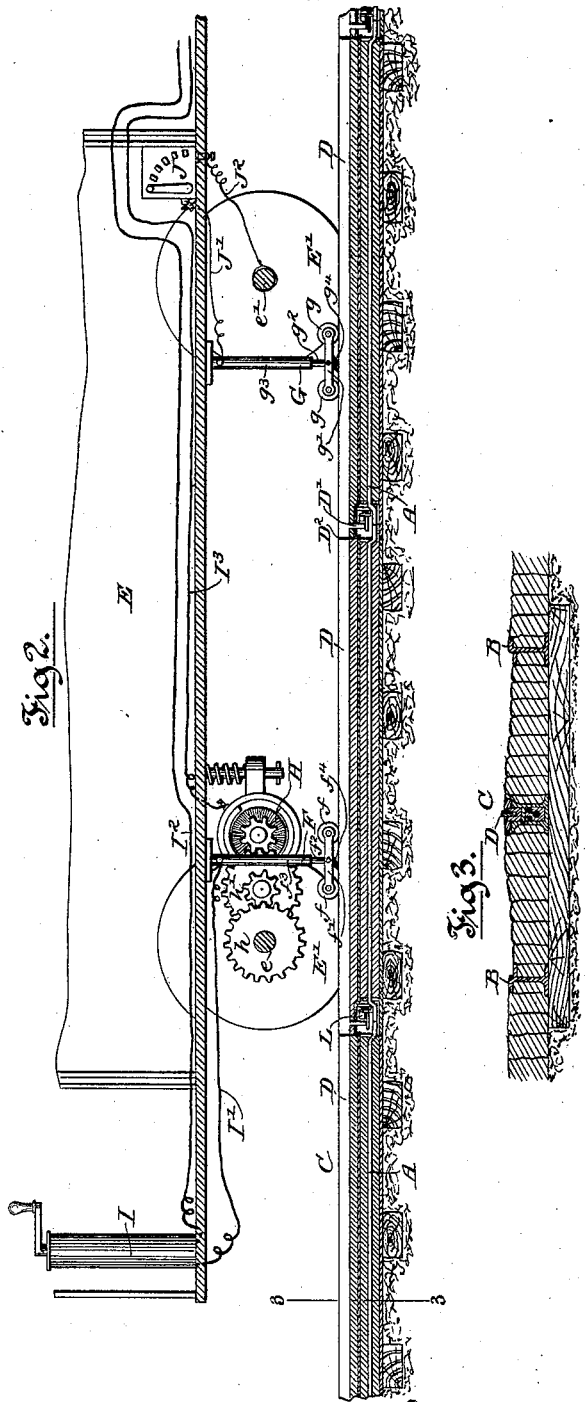
Witnesses
Wm. F. Fleming
Louis W. Whitehead
Inventor
Charles K. Harding
by Dayton, Poole & Brown
Attorneys.
THE NORRIS PETERS CO., PHOTO-LITHO., WASHINGTON, D. C.

(No Model.) 2 Sheets—Sheet 2.

C. K. HARDING.
ELECTRIC RAILWAY SYSTEM.

No. 437,358. Patented Sept. 30, 1890.

Witnesses
Wm. F. Henning
Louis M. F. Whitehead

Inventor
Charles K. Harding
by
Dayton, Poole & Brown
Attorneys.

UNITED STATES PATENT OFFICE.

CHARLES K. HARDING, OF ATLANTIC, IOWA.

ELECTRIC-RAILWAY SYSTEM.

SPECIFICATION forming part of Letters Patent No. 437,358, dated September 30, 1890.

Application filed June 9, 1890. Serial No. 354,698. (No model.)

*To all whom it may concern:*

Be it known that I, CHARLES K. HARDING, of Atlantic, in the county of Cass and State of Iowa, have invented certain new and useful Improvements in Electric-Railway Systems; and I do hereby declare that the following is a full, clear, and exact description thereof, reference being had to the accompanying drawings, and to the letters of reference marked thereon, which form a part of this specification.

This invention relates to an improvement in electric-railway systems of that class which embraces a central generating-plant, electric motors upon the vehicles to be propelled, and conductors through which the current generated is conveyed to the several motors; and one of the principal objects of my invention is to provide an improved construction in means for distributing the electric current from a dynamo or generator to a series of electric motors upon vehicles or trains, by which the employment of overhead or other exposed supply-conductors carrying the current from the generator to the motors may be dispensed with, thereby insuring entire safety from accidents liable to occur wherever exposed conductors are employed.

My invention has reference more especially to that means of distribution known as the "multiple-arc" system, or that in which the translating devices employed for converting electric into mechanical energy are located in parallel or branch circuits derived from a main conductor, which is supplied from the generator, and in which part of the circuit may be, if desired, formed by the ground instead of by a return-wire, such system being heretofore employed in electric street-railways, wherein the current from the generator after passing through the motor commonly passes through the wheels of the vehicle to the track-rails, and from thence to the ground.

My invention embraces as one of its principal features an insulated continuous main or supply conductor, a series of exposed separate insulated conductor-sections arranged parallel with the continuous or supply conductor, traveling contact devices on the vehicle for taking the motor current from the said sections and electro-magnetic contact-devices for bringing the said conductor-sections separately into electric connection with the continuous or supply conductor, such contact devices being operated by an exciting-current derived from the main conductor through a second traveling contact device on the vehicle, whereby each of said sections is brought into connection with the supply only when a vehicle is passing the same. By this construction I am enabled to locate the insulated conductor-sections in any position in which they may be most conveniently placed for exposure to the traveling contact devices of the motors, because there is no current in said sections except when the traveling contact devices are passing over the same, while at the same time the main or supply conductor may be completely insulated and placed in position most suitable for its protection from mechanical and other injury.

My invention also embraces a conduit or inclosure surrounding and insulating the supply-conductor by which the current is conveyed from the generator or source of supply to the motors on the vehicles, such conduit being entirely closed, so as to prevent the possibility of access of water or moisture to the conductor, together with a series of insulated conductor-sections sustained in the conduit with their outer edges exposed in such manner that they may be acted upon by the traveling contact devices of the vehicle, and means for bringing said insulated section separately and successively into electric connection with the supply-conductor, such conduit being adapted to be placed in the ground between the track-rails or elsewhere along the rails in such manner as to allow the contact devices of the vehicle to move upon or in contact with the insulated conductor-sections.

The invention may be more readily understood by reference to the accompanying drawings, which show one practical form of apparatus embodying my invention.

Figure 5:
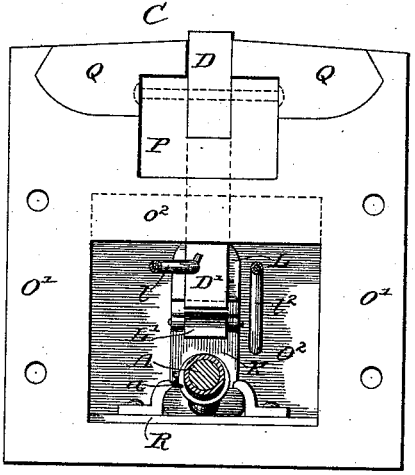
Figure 6:
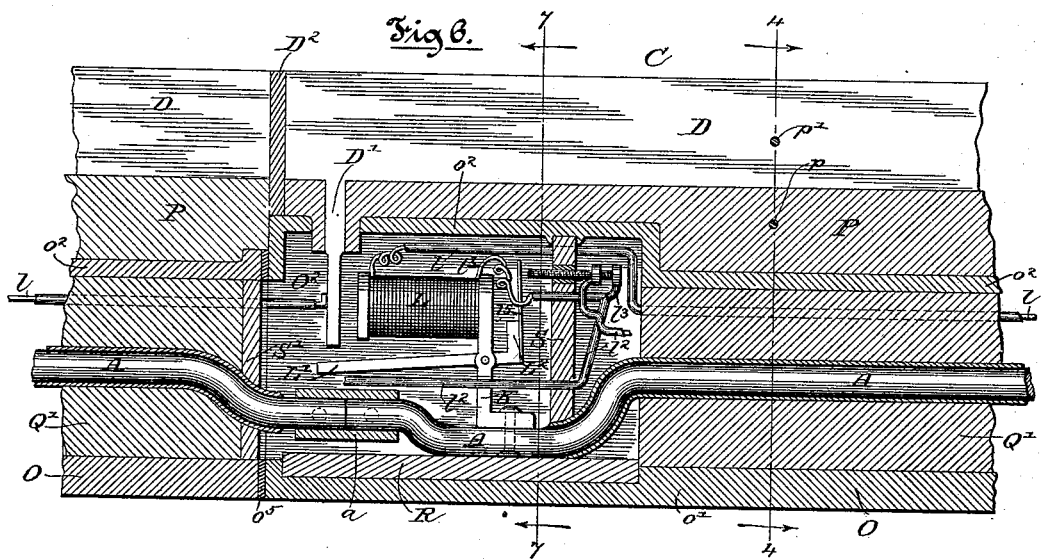
Figure 7:
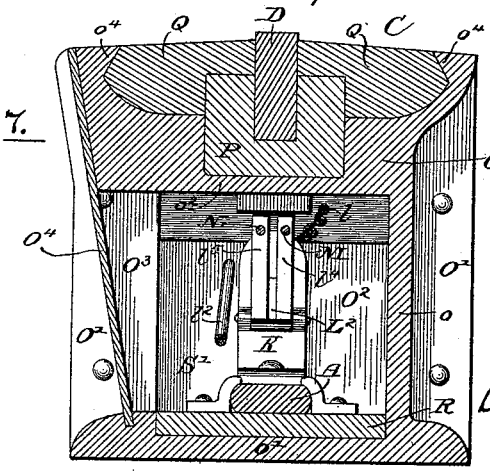

In said drawings, Figure 1 is a diagram illustrating the construction of the electric devices forming part of my invention. Fig. 2 is a central longitudinal vertical section of a conduit for a railway, together with a car, showing the several operative parts within and adjacent to the same. Fig. 3 is a cross-section through the conduit and track-rails, taken upon line 3 3 of Fig. 2. Fig. 4 is an enlarged detail cross-section of the conduit, taken upon line 4 4 of Fig. 6. Fig. 5 is an enlarged detail cross-section showing one of the conduit-sections in end view. Fig. 6 is an elarged detail view in longitudinal vertical section of the adjacent ends of two conduit-sections, together with the parts adjacent thereto. Fig. 7 is a detail cross-section taken upon line 7 7 of Fig. 6.

As illustrated in the said drawings, A is the insulated main or supply conductor of the system, which is connected at one end with the dynamo or electric generator at the central station or plant, and which extends throughout the length of road on which the cars are to be operated. Said conductor is located within a conduit, herein shown, Fig. 3, as located between and parallel with the track-rails B B, said conduit being indicated in the drawings as a whole by C.

D D D are a series of separate insulated conductor-sections arranged end to end parallel with the supply-conductor A, with insulating material between them, as indicated at $D^2 D^2$, and sustained in the upper part of the conduit C in such manner that the upper edges of said conductor-sections are exposed to allow contact therewith of the traveling contact devices upon the car or vehicles. Said conductor-sections may be made of any suitable metal, as iron, copper, or phosphor-bronze, or of a combination of metals.

E represents the car or vehicle having wheels E' E', which rest on the track-rails B B, and carrying brushes or traveling contact devices F and G, which travel in contact with the conductor-sections D D. The contact device F, as herein shown, consists of rollers $f\ f$, mounted on a horizontal bar $f'$, which is attached to a non-rotating stem $f^2$, having sliding bearing in a depending insulated arm $f^3$, which is rigidly attached to the car, separate brushes $f^4$ being also preferably attached to the bar $f'$ and bearing on the conductor-section to afford a greater area of contact with the latter. The traveling contact device G similarly consists of two anti-friction wheels or rollers $g\ g$, mounted on a longitudinal bar $g'$, having a vertical stem $g^2$, which is guided in a depending insulated arm $g^3$, attached to the car and provided with brushes $g^4$, attached to said bar and acting on the conductor-section. The bars $f'\ g'$ are adapted to play freely in a vertical direction by the sliding of the stems $f^2\ g^2$ in the arms $f^3\ g^3$, thereby allowing the anti-friction rollers $f\ f\ g\ g$ to remain in contact with the insulated conductor-sections, notwithstanding irregularities in the same or in the track-rails. As herein shown, the contact devices act by gravity; but, if found necessary or desirable, springs may be employed to hold them against the conductor-sections.

H indicates an electric motor, the shaft of which is connected by means of gear-wheels $h\ h'$ with the axle $e$ of the wheels E' E'.

I indicates one of the rheostats, which are commonly placed at opposite ends of the car for controlling the current passing through the car-motor, and I' a conductor on the car leading from the arm $f^3$ to said rheostat I; $I^2$, a conductor leading to the rheostat at the opposite end of the car, which is not shown in the drawings, and $I^3$ a conductor leading from the rheostat last mentioned to the motor H.

J is a rheostat or resistance box, and J' is a conductor leading therefrom to the arm $g^3$ of the contact device G, and $J^2$ is a conductor leading from the said rheostat J to the wheel-axle $e'$, by which electric connection is made with the track-rails.

It is of course understood that the opposite electrode or terminal of the motor is connected with the ground through the medium of a conductor leading therefrom to the axle $e$ in the usual manner.

The current for operating the electric motor is transmitted from the insulated main conductor A to the insulated conductor-sections D D D by contact devices constructed, as more clearly shown in the diagram, Fig. 1, and each of which is made as follows: Attached to each section D is a bar or rod D' in electric connection with said section, and forming a conductor through which the current is transmitted to said section. K is an arm or standard, which is in electric connection with the said conductor A, and is arranged adjacent to the arm or bar D'. L is an electro-magnet supported on the arm K, and L' is an armature pivoted to said arm K and arranged opposite the pole-piece of the magnet L. Said armature L' is adapted for contact with the bar D' when drawn by the magnet toward the latter, but is arranged to fall away from the said bar D', either by gravity or by a suitable spring, at times when the electro-magnet is inert or when no current is passing through the coils of the same. In the particular construction illustrated the said armature L' is arranged horizontally with its free end beneath the said bar D', so that it tends to fall by gravity away from the latter. The magnet shown has only a single coil, so that the armature forms in effect part of the magnetic circuit of the magnet. It follows from the construction described that when said armature L' is drawn into contact with the bar D' by the passage of an electric current through the coils of the electro-magnet L, an electric connection between the main or supply conductor A, and the insulated section D will be established through the bracket K, the armature L', and the bar D'. One terminal of the magnet-coil of each of the electro-magnets L is connected with a conductor $l$, with a conductor-section adjacent to that to which the electro-magnet belongs—as, for instance, in the diagram, Fig. 1, the several conductor-sections D D D are numbered, for convenience, 1, 2, and 3, and in said Fig. 1 the conductor $l$ extends from the electro-magnet of conductor-section No. 1 to and is connected with the bar D' of conductor-section No. 2, while the conductor $l$, belonging to the conductor-section No. 2, extends to and is connected with the bar D' of section No. 3. The other end of the coil of each magnet is connected with a conductor $l'$, to which is connected two branch conductors $l^2$ $l^3$. The branch conductor $l^3$ leads to an insulated contact-point M, which is located adjacent to the electro-magnet and in position for contact with an arm $L^2$ of the armature L', the parts being so arranged that the arm $L^2$ will be in contact with the contact-piece M at the same time that the armature itself is in contact with the bar D'. The other branch conductor $l^2$ leads to the contact device belonging to the adjacent conductor-section remote from that to which the conductor $l^2$ is connected. In other words, said conductor $l$ leads to the section at one end of the section to which the magnet belongs, while the conductor $l^2$ leads to the contact devices belonging to the conductor-section at the opposite end of said section to which the electro-magnet belongs. The terminal of said branch conductor $l^2$ is attached to a contact-piece N, which is arranged for contact with the arm $L^2$ of the armature L' in the same manner as the contact-piece M, the parts being so arranged that the said arm $L^2$ is brought in contact with both of the contact-pieces M and N when the armature is acted upon by the electro-magnet and is released or freed from contact with said contact-pieces, when said armature is free from the influence of the electro-magnet and has fallen away from or out of contact with the bar D'.

In the operation of the parts of the apparatus above described the current which actuates the motor on the car or vehicle is derived from the main conductor A, and passes from said conductor through one of the insulated conductor-sections D to the traveling contact device F of the vehicle, connection being afforded between said section D and the main conductor through the medium of the bracket K, armature L', and the bar D', when, by the passage of a current through the coils of the electro-magnet L, the armature L' is held against the bar D'. The traveling contact device G is arranged at a distance from the traveling contact device F equal to the length of one of the conductor-sections D, so that when said traveling contact device F, which carries the main current to the motor, is engaged with one conductor-section the traveling contact G will be engaged with the adjacent conductor-section in advance of it, the construction being such that said traveling contact device G forms with the conductor-section with which it is in contact and with the coils of the electro-magnet belonging to the insulated section at the rear of the one upon which the said contact device G is resting, a circuit carrying a branch electric current derived from the main conductor, the said magnet coils and traveling contact device G thus being in parallel, or in multiple arc, with the motor, and the quantity of such branch current being determined by the rheostat or resistance-box J. In other words, the electro-magnet contact device, by which each conductor-section is brought into connection with the continuous main conductor, is held in position for maintaining such connection during the time the traveling contact device F is passing along or over each conductor-section, by means of a branch electric current established through the traveling contact device G and the next adjacent conductor-section in advance of it.

It will of course be understood that the quantity of current required to operate the electro-magnetic contact device is relatively small and that sufficient resistance will be introduced in the circuit by the resistance-box J to prevent the passage of more than the necessary quantity of current.

The branch conductor $l^2$ is for the purpose of establishing a current through each electro-magnet L as soon as the traveling contact device G reaches the conductor-section next in advance of that to which the electro-magnet belongs, in order to draw the armature against the bar D', and thereby establish electric connection between the said conductor-section D and the supply-conductor A. This may be more readily understood by reference to Figs. 1 and 2. Supposing the traveling contact device F of the motor-circuit has just passed from the conductor-section No. 1 to the conductor-section No. 2, the traveling contact device G will at the same time pass from the conductor-section No. 2 to conductor-section No. 3. When the traveling contact G is still on conductor-section No. 2, the armatures L' of Nos. 2 and 3 will be free from the bars D'; but as soon as the said traveling contact device G passes from the conductor-section No. 2 to conductor-section No. 3 a circuit will be completed through the magnet-coils of No. 2, said circuit being derived from conductor A through the branch conductor $l^2$ and the contact devices of No. 1. At this time a closed circuit may be traced from the conductor A through the bracket K, the arm $L^2$, and contact-piece N of section No. 1, through the branch conductor $l^2$, the conductor $l$ to the bar D', and conductor-section No. 3. As soon, however, as the circuit is completed through the magnet-coils of section No. 2, the armature will be drawn into contact with the bar D', thereby making connection between the conductor-section No. 2 and the conductor A. At the same time, however, the arm $L^2$ of the armature will be brought against the contact-pieces M and N of said section No. 2, thereby establishing a circuit from the said conductor A through the bracket K, the arm $L^2$, the contact-piece M, the branch conductor $l^3$, the conductor $l'$, and the magnet-coils of section No. 2, and also through the conductor $l$ and section No. 3. After the circuit has been completed as last described, the current will cease to pass through the conductor $l^2$, from the fact that it will have a shorter or more direct path with less resistance through the parts last referred to, and the armature will be maintained in contact with the bar D' during the passage of the traveling contact device over the said section No. 2 by means of the current passing through said parts last referred to. As soon as the contact device F has passed from section No. 1 and the contact device G has passed from section No. 2 to No. 3, the circuit through the magnet-coils of section No. 1 will be broken and the armature belonging to the latter will fall away from the bar D', thus breaking the connection between the said section D, No. 1, and the conductor A and leaving said section No. 1 completely insulated.

In order to prevent interruption of the current supplying the motor in the passage of the traveling contact device F from one conductor-section to another, said traveling contact device is so constructed as to overlap the insulated space between the ends of the adjacent conductor-sections, and for this purpose the contact device F is herein shown as provided with two anti-friction wheels $f f$, hereinbefore described, it being obvious that one of said anti-friction wheels or rollers will rest in contact with one conductor-section, while the other wheel or roller is still in contact with the other section. The contact device G, being similarly constructed, the branch circuit by which the electro-magnetic contact device is actuated will be maintained through the electro-magnet belonging to contact device of one section—as, for instance, section No. 1—until the rearmost anti-friction wheel $f$ has passed clear of said section No. 1. It follows that for a short time during the passage of the traveling contact device from one section to another both of the two adjacent conductor-sections will be in the circuit, or, in other words, that the current supplying the motor will pass in part through one conductor-section and in part through the other conductor-section at such time.

The conduit C embraces important features of novelty, and in the form thereof which I have for convenience herein illustrated is made up of separate lengths or sections, each of which is of the same length as one of the conductor-sections, and contains in one end the electro-magnetic contact devices hereinbefore described, said conduit for this purpose being provided with a recess or chamber to contain the same. Each section of the conduit consists of a casting O, made hollow or tubular in its lower part, and having in its upper part a longitudinal recess or channel within which is placed the conductor-section and the insulating material which surrounds and supports the same. In the particular construction of the conduit herein illustrated the same is made with two parallel side walls $o\ o$, a horizontal bottom plate $o'$, which preferably extends outwardly beyond the side walls in the form of flanges, so as to give a firm bearing or support for the conduit when the latter is sustained on the cross-ties in the manner shown, Fig. 3, and a horizontal diaphragm $o^2$, arranged above and parallel with the horizontal bottom plate, forming a closed passage within which the main conductor A and the conductors $l$ and $l^2$ are located. At their upper margins the said walls $o\ o$ are preferably provided with outwardly and upwardly extending flanges $o^3\ o^3$, affording a wide space at the top of the conduit for the insertion of insulating or filling material at opposite sides of the conductor-section.

In connection with a conduit constructed in the particular form described I employ a support P of insulating material, which is fitted between the upper vertical parts of the side walls $o\ o$ of the conduit and rests upon the diaphragm $o^2$ thereof, and is notched or grooved in its upper surface to receive the conductor-section, which, in the instance illustrated, is formed of a flat bar arranged with its flat sides vertical. The insulating-support P, when thus made, will be constructed of wood, porcelain, or other material of sufficient hardness, strength, and rigidity to support the conductor-section in position and to withstand any strains, shocks, or blows to which the said section may be subjected. If made of wood, the support P may extend continuously the entire length of the conduit-section; but if made of porcelain or other similar material it will commonly consist of short pieces or blocks, which may be set in contact with each other or at some distance apart, as may be found necessary or desirable. Said support P will be secured to the conduit and to the conductor-section by any suitable fastening devices, those herein shown consisting of bolts or rivets $p$, inserted through the opposite side walls of the conduit and the lower part of the support P, and similar bolts or rivets $p'$ inserted through the upper part of the said support P and through the conductor-section.

The support P preferably terminates considerably below the upper edge or surface of the conductor-section and the space at either side of the conductor-section, and between the latter and the flange $o^3$ of the conduit is filled with masses Q Q of insulating material, applied, preferably, in a plastic condition, the inner surfaces of the said flanges being provided with projections roughened or otherwise constructed to retain said masses Q Q in place. A desirable construction of the parts is herein shown, in which the flanges $o^3\ o^3$ are provided at their upper edges with inwardly-extending ribs $o^4\ o^4$, which serve to hold the said insulating fillings Q Q in place, while at the same time affording a thick or strong margin at the upper edges of the side walls of the conduit to give suitable strength to the same and to partially protect the fillings Q Q, it being intended that the upper edges of the conduit shall be set flush with the surface of the street-roadway, so that considerable strength is required therein to withstand the wear and rough usage to which they may be subjected. The upper edge of the conductor-section is preferably placed considerably above the side margins of the conduit, and the filling Q Q sloped or inclined from the conductor-section outwardly to the side margins of the conduit. This construction brings the exposed part of the conductor-section above the level of the roadway adjacent to it, so that water will tend to flow away from the conductor-section, and the rapid and prompt drying of the latter will be facilitated. The elevation of the upper edge of the conductor-section above the edges of the conduit in the manner described also enables the conductor-section to be worn away to a considerable extent without bringing it too low with reference to the sides of the conduit, it being obvious that if the conductor-section was originally set level with the sides of the conduit any wearing away of the same would form a depression in which water might accumulate.

The conductors within the tubular part of the conduit may be insulated in any manner found convenient or desirable, but preferably they are embedded in a mass Q' of insulating material, which fills the entire space within the conduit, and thereby insures the exclusion of moisture, gases, and other substances which might act injuriously upon the wires or upon the insulation immediately surrounding the same, it being intended even when said insulating filling is used to employ conductors provided with the usual wrapped or braided fibrous or other insulating coating. The employment of such additional insulated filling is highly desirable in an electric system of the kind described herein, for the reason that the additional insulation thus obtained renders safe the carrying of the additional voltage, which is rendered possible by the system of supplying the motors herein described.

The several conduit-sections constructed as described are attached to each other by joints made water and air tight, and which are at the same time adapted for allowing expansion and contraction of the metal forming the conduits. As herein shown, the sections are provided at their ends with flanges O' O', Figs. 5 and 7, through which are inserted bolts to hold together the sections, a packing-ring $o^5$ of elastic or compressible material being inserted between the flanges to make tight joints and to provide for the expansion and contraction of the sections, said ring $o^5$ being arranged to extend between the abutting ends of the diaphragms $o^2$, Fig. 6, so that the access of air or moisture to the lower or tubular part of the conduit is effectually prevented. At one end of each conduit-section is formed an enlargement or chamber $O^2$, Figs. 6 and 7, within which is placed the several parts constituting the contact device. To form such chamber the diaphragm $o^2$ is elevated to give suitable depth to the same, and the side walls $o$ $o$ are spread apart to give suitable width.

To afford access to the interior of the chamber $O^2$ an opening $O^3$ is made in one side of the same, such opening being provided with a cover $O^4$. (Herein shown, Fig. 7, as being held in guide-grooves at the sides and bottom of the opening, and adapted to slide into place from above.) The joints around said cover are packed or luted with some plastic material to exclude air and moisture.

The several operative parts of the contact device are herein shown as constructed and arranged within the chamber $O^2$ as follows:

R is a plate or slab of wood or other insulating material placed in the bottom of the chamber, and which supports one end of that part or section of the conductor A which is within the conduit-section. The bracket K, which sustains the electro-magnet, is herein shown as resting upon and rigidly attached to the end portion of the conductor, which is sustained upon the plate or slab R, said bracket being free from contact with the iron casing, so that it is entirely insulated from the same.

S is a support composed of insulating material, which sustains the contact-pieces M and N, the latter being herein shown as having the form of screws inserted through the support S, thereby enabling said contact-pieces to be bodily adjusted with reference to the arm $L^2$ of the armature. Said arm $L^2$ in this construction consists of two separate flexible arms or prongs $l^4$ $l^5$, adapted to separately engage the contact-pieces M and N, so that perfect contact will be made with both of the said contact-pieces, without reference to the adjustment of the armature to which said prongs $l^4 l^5$ are attached. The bar D' in this construction passes downwardly through the insulating-support P, through an opening in the diaphragm $o^2$ into the chamber $O^2$, the bar being suitably insulated from the diaphragm where it passes through the same, as shown.

The end of the tubular part of the conduit, adjacent to the joint between the conduit-sections, is preferably closed by a plate or slab $s'$, of wood or other insulating material, to form an end wall, against which the filling Q' will come in inserting the same. The conductors $l$ and $l^2$ are extended through the said slab $s'$, and their ends project beyond the same, so as to enter the chamber $O^2$, when the sections are placed together, said conductors being joined within the chamber to the parts with which they are connected by soldering or in any other convenient manner. The conductor A also projects through the slab S', and the adjacent ends of the parts of the said conductor may be united by any suitable form of joint, that herein shown consisting of a sleeve $a$, fitting over same within the chamber $O^2$, and secured by solder or otherwise.

It will of course be understood that the particular arrangement illustrated of the parts of the contact device within the chamber is only one of the many which may be employed without departure from my invention.

In laying the conduit constructed as hereinbefore described the filling Q Q over the joints between the sections will not be inserted until after the conduit-sections have been put in place and bolted together, it being the intention that such filling should be applied in plastic state, so as to extend continuously from one conduit-section to another, thereby aiding in excluding water from the joints between the conduit-sections. The insulation between the adjacent ends of the sections will preferably consist of plates $D^2 D^2$ of hard and strong insulating material, such as vulcanized fiber or hard rubber. In order that said plates may be strongly and securely held in place, they will preferably be arranged to extend outwardly between the ends of the insulating-supports P P, with their lower edges in contact with the diaphragm $o^2$ in the manner clearly shown in Fig. 6.

The means herein described for transmitting the current from a central station to the electric motors on vehicles has the advantage of affording perfect safety to persons and animals, even though the same may come in direct contact with the exposed conductor-sections, through which the current is transmitted to the traveling contact devices or brushes of the vehicles, it being obvious from what has been heretofore stated that in no case can any one of said conductor-sections be brought into electric connection with the main line or supply conductor, which is connected with the source of electric supply, except when the traveling contact devices of the vehicle are passing over the conductor-section. It is obvious, furthermore, that the said conductor-sections can only be brought progressively or successively into electric connection with the main or supply conductor. This will be understood from the fact that the branch circuit can only be established through the second or auxiliary traveling contact device G when the same is resting on one conductor-section, and a conductor-section at the rear of it is in electric connection with the main or supply conductor, for the reason that such branch circuit by which the electro-magnetic contact device is operated can only be established through the magnet-coils when the main contact devices of such section at the rear of the one on which the contact device G is moving is closed. If, therefore, both of the brushes or traveling contact devices of the vehicle are removed from contact with the conductor-sections, the electric circuits between the exposed conductor-sections and the supply-conductor cannot be re-established except by closing one of the contact devices by mechanical or other means especially applied for the purpose, and in practice this may be done in case of an accident—such as the derailment of the car—by opening one of the chambers of the conduit and moving the armature of the contact device by hand, or by bringing forward from the supply-station another similar vehicle. A magnet may be employed to move the armature so as to close the circuit, in which case the electric connection may be re-established without opening the conduit.

The employment of the circuit-controlling device in the branch circuits (formed in the particular construction herein illustrated by means of conductors $l^2$ and $l^3$) is obviously necessary in order to maintain said circuits normally open and thereby prevent the passage of any current from the supply-conductor through the coils of the electro-magnets to the conductor-sections, or from one to another of the conductor-sections, it being obvious that inasmuch as one terminal of each of said coils is connected with one conductor-section, the other terminal must be temporarily connected with the main or supply conductor in order to derive the branch current through the electro-magnet coils, and if such connection were permanent a path for the current would be afforded from the supply-conductor to each conductor-section. By the employment of circuit-controlling devices in said branch circuits, however, which circuit-controlling devices are controlled by the movement of the armatures belonging to the contact devices, said circuits are closed only when the main contact devices are closed and are open at all other times, so that the conductor-sections are completely insulated except when the vehicle is passing over or along the same, at which time the conductor-sections are covered or protected by the body of the vehicle or vehicles. As far as the breaking of said branch circuits at the proper time is concerned, it is not necessary that the circuit-controlling devices should consist of contact-pieces which are acted upon directly by a part or arm attached to the armature of each contact device in the manner illustrated; but said circuit-controlling devices for the branch circuits may be operated or controlled by or from said main contact devices or the armatures thereof by other devices, either electric or mechanical in their character—as, for instance, the conductor $l^2$, which forms part of the branch circuit by which the electro-magnet is excited to close the main contact device, is shown in the drawings as extending from each contact device to the one at the rear of it, referring to the direction of movement of the car, and said conductor $l^2$ is shown as connected with the main or supply conductor by means of a circuit-controlling device located adjacent to the contact device last referred to. This construction is not, however, essential, and the said conductor $l^2$ may be connected with the main or supply conductor at any other point, and through a circuit-controlling device elsewhere located, provided said circuit-controlling device is operated from, by, or in unison with the said contact device last referred to by suitable electrical or mechanical connections, it only being necessary that the circuit-controlling device should be closed to complete a circuit through the conductor $l^2$ when the said contact device is closed, and should be opened to break the circuit through said conductor $l'$ when said contact device is opened.

By reason of the complete insulation of the exposed conductor-sections made possible or obtained by the construction herein illustrated a current of much higher voltage may be employed in an electric railway system embodying such features of construction than has been heretofore safe or practical in electric railways, it being obvious that the main or supply conductor of my apparatus may be insulated in the most perfect manner to carry safely currents of the highest tension, while in no case is such conductor brought into electric connection with any object except through the conductor-sections and the brushes or traveling contact devices of the vehicle when protected by the latter. It is to be especially noted in this connection that there is little or no danger of the escape of the current from the conductor-sections by reason of defective insulation, it being a matter well understood in the art that short or small sections of conducting material are less liable to leakage than greater lengths of the same kind of conducting material even when provided with insulation of the same kind or character.

By the employment of the electro-magnet contact devices herein shown in connection with the secondary or auxiliary brushes or traveling contact devices on the car and resistance devices, all of which are arranged in parallel or multiple arc with the motor-circuit, I am enabled to operate said contact devices by the use of a very small proportion of the entire current supplied for the operation of the electric-railway system, while at the same time enabling the electro-magnet coils and other parts to be made of small size and economical in construction. A system thus constructed therefore has the advantages of being more economical, both as in the consumption of current and in the first cost of the plant and the maintenance thereof, as compared with a similar system in which the electro-magnet coils of the contact devices are placed in a series with the motor on the car. The construction last referred to is, however, a practical one, although, as far as I am now aware, not so advantageous as that herein specifically illustrated and described; but inasmuch as it is, as far as I know, a novel one, and affords a means of carrying out the general or broad features of my invention, the same is intended to be covered by the broad claims hereto appended.

The location of the main or supply conductor within an inclosure or conduit which is embedded in the ground, and is parallel with the return-conductors formed by the track-rails and the earth, has the important advantage of preventing inductive interference with telephone or other wires which may be located adjacent thereto, and in this respect the conduit system herein described has the same advantages as the so-called "double-trolley" system of distribution for electric railways which has heretofore been devised for this same purpose.

I claim as my invention—

1. An electric railway comprising an insulated continuous main or supply conductor, a series of separate exposed insulated conductor-sections, an electric motor on the vehicle to be driven, a traveling contact device in circuit with the motor moving in contact with said conductor-sections, electro-magnetic contact devices constructed to bring said conductor-sections separately into electric connection with the main or supply conductor, normally-open branch circuits in multiple arc with the motor for operating said contact devices, and means for closing said branch circuits, comprising a conductor upon the vehicle through which said branch circuits are successively closed in the passage of the vehicle, substantially as described.

2. An electric-railway system comprising an insulated continuous main or supply conductor, a series of separate exposed insulated conductor-sections, an electric motor on the vehicle to be driven, a traveling contact device upon the vehicle in contact with the conductor-sections and forming part of the motor-circuit, electro-magnetic contact devices constructed to bring said conductor-sections separately into electric connection with the main or supply conductor and normally-open branch circuits in multiple arc with the motor for operating said contact devices, said branch circuits embracing said conductor-sections, a conductor on the vehicle, and a second traveling contact device on the vehicle moving in contact with the conductor-sections, substantially as described.

3. An electric-railway system comprising an insulated continuous main or supply conductor, a series of separate exposed insulated conductor-sections, an electric motor on the vehicle to be driven, a traveling contact device in circuit with the motor moving in contact with said conductor-sections, electro-magnetic contact devices constructed to bring said conductor-sections separately into electric connection with the main or supply conductor, and normally-open branch circuits in multiple arc with the motor for operating said contact devices, said branch circuits embracing said conductor-sections, a conductor on the vehicle, and a second traveling contact device on the vehicle, also moving in contact with the conductor-sections, but arranged to rest in contact with the conductor-sections other than those upon which rest the first or motor contact device, substantially as described.

4. An electric-railway system comprising an insulated continuous main or supply conductor, a series of separate exposed insulated conductor-sections, an electric motor on the vehicle to be driven, a traveling contact device upon the vehicle in contact with the conductor-sections and forming part of the motor-circuit, electro-magnetic contact devices constructed to bring said conductor-sections separately into electric connection with the main supply-conductor, and branch circuits in multiple arc with the motor embracing conductors connecting the magnet-coils of the electro-magnetic contact devices of the several conductor-sections with adjacent conductor-sections, and a second traveling contact device on the vehicle arranged to move in contact with conductor-sections other than those upon which the first or motor contact devices rest, substantially as described.

5. An electric-railway system comprising an insulated continuous main or supply conductor, a return-conductor, a series of separate exposed insulated conductor-sections, an electromotor on the vehicle to be driven in circuit with the said conductor-sections and with the return-conductor, a traveling contact device upon the vehicle in contact with the said conductor-sections and forming part of the motor-circuit, electro-magnetic contact devices constructed to bring said conductor-sections separately into electric connection with the main or supply conductor, and branch circuits in multiple arc with the motor, said branch circuits embracing conductors connecting the magnet-coils of the electro-magnetic contact devices of the several conductor-sections with adjacent conductor-sections, a second traveling contact device on the vehicle arranged to move in contact with the conductor-sections, but to rest in contact with sections other than those upon which the first or motor contact device rests, and a conductor on the vehicle in electric connection with the said return-conductor, substantially as described.

6. The combination, with an insulated continuous main or supply conductor, of a series of separate exposed insulated conductor-sections, electro-magnetic contact devices for each conductor-section adapted to bring the same separately into electric connection with the continuous or supply conductor, conductors connecting the electro-magnet of each contact device with the next adjacent conductor-section at one side of the same, other conductors leading from the opposite terminals of the electro-magnet coils of the several contact devices, each of said conductors being branched to form two circuits, both of which are connected with the main or supply conductor, one of said circuits being provided with a circuit-controlling device controlled by the contact device of which said electro-magnet forms a part and the other circuit being provided with a circuit-controlling device controlled by the contact devices belonging to the next adjacent conductor-section at the opposite side of said contact device last mentioned, substantially as described.

7. An electric-railway system comprising an insulated continuous main or supply conductor, a series of separate exposed insulated conductor-sections, an electric motor on the vehicle to be driven, traveling contact devices on the vehicle, electro-magnetic contact devices for bringing said conductor-sections separately into electric connection with the continuous or supply conductor, a conductor connecting the magnet-coils of the electro-magnet of the contact device of each conductor-section with the next adjacent conductor-section, a second traveling contact device on the vehicle arranged to move in contact with the conductor-sections adjacent to those upon which the contact devices of the motor-circuit are resting, whereby branch circuits parallel with the motor-circuits are completed through said magnet-coils, and a resistance device upon the vehicle in circuit with said magnet-coils and conductor-sections, substantially as described.

8. The combination, with an insulated continuous main or supply conductor and a series of exposed separate insulated conductor-sections, of an electro-magnetic contact device for bringing each section separately into electric connection with the main or supply conductor, said contact device consisting of an arm or bar in electric connection with the conductor-section, an electro-magnet and a movable armature operating to close the connection between the said arm or bar and the main conductor when a current is passing through the electro-magnet coils, a conductor leading from one terminal of said electro-magnet coil to the next adjacent conductor-section at one side of said contact device, and a conductor leading from the opposite terminal of the electro-magnet coil and branched to form two circuits, each of which includes a circuit-controlling device, one of said circuit-controlling devices being actuated by the armature of the said contact device and the other circuit-controlling device being actuated by the armature of the contact device belonging to the next adjacent conductor-section at the opposite side of said contact device, substantially as described.

9. The combination, with a continuous insulated main conductor, of a series of insulated exposed conductor-sections, blocks of insulated material interposed between the ends of the sections and forming a continuous bearing-surface, and a conduit surrounding or inclosing the said continuous main conductor and embracing a continuous body of insulating material by which the said conductor-sections and insulating blocks are supported, substantially as described.

10. The combination, with a continuous insulated main conductor, of a series of insulated exposed conductor-sections, blocks of insulated material interposed between the ends of said sections, contact-making devices for bringing the said insulated sections separately into circuit with the main conductor, and a conduit surrounding or inclosing the said continuous main conductor and contact devices, said conduits embracing a continuous body of insulating material in which the said conductor-sections are embedded with one of their side edges exposed, substantially as described.

11. The combination, with a continuous insulated main conductor, of a series of exposed insulated conductor-sections, and a conduit surrounding or inclosing the said continuous conductor and provided at one side with a mass or body of insulating material in which the said insulating sections are embedded and by which they are supported with one of their sides or edges exposed, substantially as described.

12. The combination, with a continuous insulated main conductor, of a series of insulated conductor-sections, contact devices for bringing the said insulated sections separately into circuit with the main conductor, and a conduit surrounding or inclosing the said continuous conductor and the contact devices and embracing an external mass or body of insulating material, by which said conductor-sections are supported and having inclosed recesses or chambers to contain the said contact devices, substantially as described.

13. The combination, with a continuous insulated main conductor, of a series of insulated conductor-sections, contact-making devices for bringing the conductor-sections separately into connection with the main conductor, a conduit consisting of a closed tubular lower part in which are located said conductors and contact devices and having in its upper part a groove or channel within which the conductor sections are located, and a mass or body of insulating material located in said groove or channel and sustaining said conductor-sections, substantially as described.

14. The combination, with a continuous insulated main conductor, of a series of insulated conductor-sections, contact-making devices for bringing the conductor-sections separately into connection with the main conductor, a conduit consisting of a tubular lower part in which are located said conductors and contact devices and having in its upper part a groove or channel within which the conductor-sections are located, supports of hard or rigid insulating material resting on the bottom of the groove or channel and engaging the lower parts of the conductor-sections, and a mass of water-proof insulating material filling the said channel at either side of the conductor-sections, substantially as described.

15. The combination, with a continuous insulated main conductor and a series of separate insulated conductor-sections, and contact devices for bringing the insulated sections into electric connection with the main conductor, of a conduit consisting of a series of conduit-sections, each conduit-section consisting of an exterior shell or inclosure of the same length as one of the conductor-sections, and containing a section of the main or supply conductor, one of the said conductor-sections and the contact devices belonging to the latter, substantially as described.

16. The combination, with a continuous insulated main conductor and a series of separate insulated conductor-sections and contact devices for bringing the insulated sections separately into electric connection with the main conductor, of a conduit consisting of a series of conduit-sections, each conduit-section consisting of an exterior shell or inclosure of the same length as one of the conductor-sections and containing a section or length of the main or supply conductor, one of the said conductor-sections and the contact devices belonging to the latter, said conduit-section being provided with a lower tubular part within which the main conductor is placed and which contains a filling surrounding said main conductor, and a groove or channel in its top in which the conductor-section is placed and within which is a mass or body of insulating material supporting the conductor-section and having at one end a recess or chamber within which the said contact devices are located, substantially as described.

In testimony that I claim the foregoing as my invention I affix my signature in presence of two witnesses.

CHARLES K. HARDING.

Witnesses:
C. CLARENCE POOLE,
GEORGE W. HIGGINS, Jr.